United States Patent
Bonanni et al.

(10) Patent No.: US 11,408,396 B2
(45) Date of Patent: Aug. 9, 2022

(54) THRUST CONTROL FOR WIND TURBINES USING ACTIVE SENSING OF WIND TURBULENCE

(71) Applicant: General Electric Renovables Espana S.L., Barcelona (ES)

(72) Inventors: Pierino Gianni Bonanni, Loudonville, NY (US); Xu Fu, Clifton Park, NY (US); Francesco Perrone, Norderstedt (DE)

(73) Assignee: General Electric Renovables Espana, S.L., Barcelona (ES)

( * ) Notice: Subject to any disclaimer, the term of this patent is extended or adjusted under 35 U.S.C. 154(b) by 18 days.

(21) Appl. No.: 17/144,377

(22) Filed: Jan. 8, 2021

(65) Prior Publication Data

US 2022/0220935 A1 Jul. 14, 2022

(51) Int. Cl.
*F03D 7/02* (2006.01)
*F03D 17/00* (2016.01)

(52) U.S. Cl.
CPC ........... *F03D 7/028* (2013.01); *F03D 7/0224* (2013.01); *F03D 17/00* (2016.05);
(Continued)

(58) Field of Classification Search
CPC ........ F03D 7/028; F03D 7/0224; F03D 17/00; F05B 2260/71; F05B 2270/1031;
(Continued)

(56) References Cited

U.S. PATENT DOCUMENTS

| | | | | |
|---|---|---|---|---|
| 7,342,323 B2 * | 3/2008 | Avagliano | ............ | F03D 7/0224 290/55 |
| 7,351,033 B2 * | 4/2008 | McNerney | ............ | F03D 7/0224 416/61 |

(Continued)

FOREIGN PATENT DOCUMENTS

| | | |
|---|---|---|
| EP | 2799711 A1 | 11/2014 |
| EP | 3 273 055 A1 | 1/2018 |

(Continued)

OTHER PUBLICATIONS

Abdallah et al., Influence of the Control System on Wind Turbine Reliability in Extreme Turbulence, XP20266233, Journal of Physics: Conference Series, Institute of Physics Publishing, vol. 524, No. 1, Bristol GB, Jun. 2014, 12069, 10 Pages.

(Continued)

*Primary Examiner* — Pedro J Cuevas
(74) *Attorney, Agent, or Firm* — Dority & Manning, P.A.

(57) ABSTRACT

A wind turbine and method are provided for defining a plurality of thrust limits for the wind turbine located at a site and having a rotor with rotor blades, wherein the thrust limits define values of aerodynamic thrust on the rotor not to be exceeded in operation. The method includes providing a wind speed distribution representative for the site and defining one or more isolines of constant turbulence probability representing a turbulence parameter as a function of wind speed. The isolines correspond to quantile levels of turbulence of the wind speed distribution and the turbulence parameter is indicative of wind speed variation. The turbulence parameter is determined by continuously measuring wind speed upstream of the rotor with an active sensing system and calculating the wind speed variations from the measured wind speed. Turbulence ranges are defined with (Continued)

respect to the isolines and thrust limits are defined for the turbulence ranges.

18 Claims, 10 Drawing Sheets

(52) U.S. Cl.
CPC ... *F05B 2260/71* (2013.01); *F05B 2270/1031* (2013.01); *F05B 2270/32* (2013.01); *F05B 2270/328* (2013.01); *F05B 2270/8042* (2013.01)

(58) Field of Classification Search
CPC ............ F05B 2270/32; F05B 2270/328; F05B 2270/8042
See application file for complete search history.

(56) References Cited

U.S. PATENT DOCUMENTS

| | | | |
|---|---|---|---|
| 7,822,560 B2* | 10/2010 | LeMieux | F03D 7/042 324/207.16 |
| 8,025,476 B2* | 9/2011 | Zheng | F03D 7/044 415/1 |
| 8,257,040 B2* | 9/2012 | Chen | F03D 17/00 416/61 |
| 9,519,056 B2* | 12/2016 | Schroeder | G01S 13/589 |
| 9,624,905 B2 | 4/2017 | Perley et al. | |
| 9,631,606 B2 | 4/2017 | Slack et al. | |
| 9,804,262 B2 | 10/2017 | Fun et al. | |
| 10,036,692 B2* | 7/2018 | Perley | F03D 17/00 |
| 10,180,129 B2* | 1/2019 | Couchman | F03D 7/02 |
| 10,294,921 B2 | 5/2019 | Bonding et al. | |
| 10,294,923 B2* | 5/2019 | Kristoffersen | F03D 7/046 |
| 2012/0179376 A1* | 7/2012 | O'Brien | G01P 5/001 702/3 |
| 2013/0033040 A1* | 2/2013 | Bowyer | F03D 7/043 290/44 |
| 2014/0028495 A1* | 1/2014 | Schroeder | G01P 5/001 342/26 R |
| 2014/0271193 A1* | 9/2014 | Baker | F03D 17/00 702/41 |
| 2014/0328678 A1 | 11/2014 | Guadayol Roig | |
| 2015/0147174 A1* | 5/2015 | Couchman | B63B 1/107 416/37 |
| 2016/0138571 A1* | 5/2016 | Perley | F03D 17/00 702/42 |
| 2017/0241405 A1 | 8/2017 | Kruger et al. | |
| 2017/0268487 A1 | 9/2017 | Yang et al. | |
| 2018/0066630 A1* | 3/2018 | Kristoffersen | F03D 7/0296 |
| 2020/0124026 A1 | 4/2020 | Nguyen et al. | |
| 2020/0347822 A1* | 11/2020 | Perrone | F03D 7/042 |
| 2021/0222672 A1* | 7/2021 | Wang | F03D 17/00 |

FOREIGN PATENT DOCUMENTS

| | | |
|---|---|---|
| WO | WO2014/0161626 A1 | 10/2014 |
| WO | WO2016/1368647 A1 | 9/2016 |
| WO | WO2018/0184645 A1 | 10/2018 |

OTHER PUBLICATIONS

Barker et al., Lidar Turbulence Measurements for Wind Turbine Selection Studies: Design Turbulence, The Old Barns, Fairoaks Farm, 2014, pp. 1-10.
Bossanyi., Un-freezing the Turbulence: Application to LiDAR-assisted Wind Turbine Control, IET Renewable Power Generation, vol. 7, Issue 4, Jul. 2013, pp. 321-329. Abstract Only.
Bossanyi et al., Wind Turbine Control Applications of Turbine-mounted LIDAR, Journal of Physics Conference Series, vol. 555, Issue 1, Dec. 2014, pp. 15.
EPO Search Report, dated Jun. 1, 2022.

* cited by examiner

THRUST CONTROL FOR WIND TURBINES USING ACTIVE SENSING OF WIND TURBULENCE

FIELD

The present invention relates to dynamic thrust control for a wind turbine rotor wherein wind turbulence is directly measured with an active sensing system, such as a Doppler lidar system, and used as an input in the control process.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

A variable speed wind turbine may typically be controlled by varying the generator torque and the pitch angle of the blades. As a result, aerodynamic torque, rotor speed and electrical power will vary.

A common prior art control strategy of a variable speed wind turbine is described with reference to FIG. 3. In FIG. 3, the operation of a typical variable speed wind turbine is illustrated in terms of the pitch angle (β), the electrical power generated (P), the generator torque (M) and the rotational velocity of the rotor (ω), as a function of the wind speed.

In a first operational range, from the cut-in wind speed to a first wind speed (e.g. approximately 5 or 6 m/s), the rotor may be controlled to rotate at a substantially constant speed that is just high enough to be able to accurately control it. The cut-in wind speed may be e.g. approximately 3 m/s.

In a second operational range, from the first wind speed (e.g. approximately 5 or 6 m/s) to a second wind speed (e.g. approximately 8.5 m/s), the objective is generally to maximize power output while maintaining the pitch angle of the blades constant so as to capture maximum energy. In order to achieve this objective, the generator torque and rotor speed may be varied so as keep the tip speed ratio λ (tangential velocity of the tip of the rotor blades divided by the prevailing wind speed) constant so as to maximize the power coefficient Cp.

In order to maximize power output and keep Cp constant at its maximum value, the rotor torque may be set in accordance with the following equation: $T = k \cdot \omega^2$, wherein k is a constant, and ω is the rotational speed of the generator. In a direct drive wind turbine, the generator speed substantially equals the rotor speed. In a wind turbine comprising a gearbox, normally, a substantially constant ratio exists between the rotor speed and the generator speed.

In a third operational range, which starts at reaching nominal rotor rotational speed and extends until reaching nominal power, the rotor speed may be kept constant, and the generator torque may be varied to such effect. In terms of wind speeds, this third operational range extends substantially from the second wind speed to the nominal wind speed e.g. from approximately 8.5 m/s to approximately 11 m/s.

In a fourth operational range, which may extend from the nominal wind speed to the cut-out wind speed (for example from approximately 11 m/s to 25 m/s), the blades may be rotated ("pitched") to maintain the aerodynamic torque delivered by the rotor substantially constant. In practice, the pitch may be actuated such as to maintain the rotor speed substantially constant. At the cut-out wind speed, the wind turbine's operation is interrupted.

In the first, second and third operational ranges, i.e. at wind speeds below the nominal wind speed (the sub-nominal zone of operation), the blades are normally kept in a constant pitch position, namely the "below rated pitch position". Said default pitch position may generally be close to a 0° pitch angle. The exact pitch angle in "below rated" conditions however depends on the complete design of the wind turbine.

The operation described above may be translated into a so-called power curve, such as the one shown in FIG. 3. Such a power curve may reflect the theoretical optimum operation of the wind turbine. However, in a range of wind speeds around the nominal wind speed, the aerodynamic thrust on the rotor may be high, as illustrated in FIG. 4. Such a high aerodynamic thrust leads to high bending loads at the blade root. The high loads at the blade root in turn can lead to high loads in the tower. If a wind turbine suffers from high loads repeatedly, the fatigue life of wind turbine components such as the blades can be reduced.

In this regard, it is known to define a thrust limit for the rotor, which is understood as a maximum level of aerodynamic thrust on the rotor that may not be exceeded in operation. The operation of the wind turbine is thus adjusted, when necessary, to avoid the thrust exceeding the thrust limit. The operation thus deviates from the theoretical optimum operation, and the electrical energy output is negatively affected.

In some sites, and particularly in offshore applications, it has been found that blades sometimes suffer from high loads at the root and fatigue damage in highly turbulent winds, even if such a thrust limit has been defined.

Thus, it would be beneficial to be able to reliably and accurately measure wind turbulence upstream of the rotor and to use such measurements to more precisely define the thrust limits on the rotor to accommodate for such turbulence. The present invention provides a solution for this need.

BRIEF DESCRIPTION

Aspects and advantages of the invention will be set forth in part in the following description, or may be obvious from the description, or may be learned through practice of the invention.

In one aspect, the present disclosure is directed to a method for defining a plurality of thrust limits for a wind turbine located at a site and having a rotor with a plurality of blades, wherein the thrust limits define values of aerodynamic thrust on the rotor not to be exceeded in operation. The method includes providing a wind speed distribution representative for the site and defining one or more isolines of constant turbulence probability representing a turbulence parameter as a function of wind speed, wherein the isolines correspond to quantile levels of turbulence of the wind speed distribution and the turbulence parameter is indicative of wind speed variation. The turbulence parameter is determined by substantially continuously measuring wind speed upstream of the rotor with an active sensing system and calculating the wind speed variations from the measured wind speed. Turbulence ranges are defined with respect to the isolines. Thrust limits are defined for each of the turbulence ranges.

In one embodiment of the method, the active sensing system uses a Doppler lidar system to generate multiple fixed measurement beams directed upwind of the wind turbine to sample an incoming wind flow. For example, in a certain embodiment, each of the fixed measurement beams may detect wind speed at a different angle relative to the rotor and at a plurality of different ranges from the rotor. for instance, in one embodiment, the Doppler lidar system may generate five fixed measurement beams, wherein each fixed measurement beam detects wind speed at ten different ranges from the rotor.

In a certain embodiment, the wind turbine includes a nacelle and the Doppler lidar system is mounted atop the nacelle. The fixed measurement beams may include a center axial beam and a plurality of other beams projecting at an angle away from the center axial beam and spaced equally around a circular circumference. For example, four fixed beams may be spaced 90 degrees apart on the circular circumference. In another embodiment, the beams need not be fixed in space, but may be used in a scanning configuration.

In an embodiment of the method, wind measurements from the plurality of different ranges for each fixed measurement beam are used to calculate a mean wind speed of the incoming wind flow and a standard deviation of the wind speed throughout the sampled field, wherein the standard deviation of the wind speed corresponds to the turbulence parameter. The wind speed measurements and calculation of the standard deviation may be performed at a rate of at least 4 Hz, and the standard deviation calculations may be smoothed by a low-pass filter. A filter time constant for the low-pass filter may be adjustable and selected to approximate a typical wind speed of the incoming wind flow.

In one embodiment, the method may include the isolines defining the standard deviation as a linear function of the wind speed within a wind speed range.

The wind speed distribution for the site may be based on wind measurements at a site of the wind turbine.

The method may also include selecting one of the thrust limits based on the determined turbulence parameter and the determined wind speed, and operating the wind turbine such that a thrust on the rotor is below the selected thrust limit. For example, the thrust on the rotor may be compared with the selected thrust limit, and if the thrust is above the selected thrust limit, the method includes sending a collective pitch signal to the blades of the rotor to pitch the blades and reduce the thrust on the rotor.

The present disclosure also includes a wind turbine that includes a rotor with a plurality of blades and a pitch system configured with the blades to rotate the blades around longitudinal axes of the blades. The wind turbine includes an active sensing system mounted on the wind turbine, such as a Doppler lidar system that generates multiple fixed measurement beams upwind of the wind turbine to detect wind speed of an incoming wind flow. The wind turbine includes a control system that is in communication with the Doppler lidar system and is configured to substantially continuously measure the wind speed of the incoming wind flow and calculate a turbulence parameter corresponding to wind speed variations of the measured wind speeds. The control system is also configured to select a thrust level based on the turbulence parameter and the measured wind speed, wherein the thrust level is selected from a plurality of thrust limits for different turbulence ranges, the plurality of thrust limits determined by quantile-based regression of a wind speed distribution of wind speed and the turbulence parameter. The control system sends signals to the pitch system to collectively pitch the blades such that aerodynamic thrust on the rotor is below the selected thrust level.

In a particular embodiment, the Doppler lidar system is configured to generate multiple fixed measurement beams upwind of the wind turbine to sample the incoming wind flow, wherein each of the fixed measurement beams measures wind speed at a different angle relative to an axis of the rotor and at a plurality of different ranges from the rotor.

In one embodiment, the Doppler lidar system is mounted atop a nacelle of the wind turbine, the fixed measurement beams including a center axial beam and a plurality of beams projecting at an angle away from the center axial beam and spaced equally around a circular circumference.

The control system may be configured to use the wind measurements from the plurality of different ranges for each fixed measurement beam to calculate a mean wind speed of the incoming wind flow and a standard deviation of the wind speed, wherein the standard deviation of the wind speed corresponds to the turbulence parameter.

The control system may perform the calculations of the wind speed measurements and the standard deviation at a rate of at least 4 Hz and to smooth the standard deviation calculations with a low-pass filter. The control system may set the filter time constant for the low-pass filter to account for a typical wind speed of the incoming wind flow and the average range of wind speed measurements from the rotor, for example at 10 seconds to reflect a typical wind speed of 10 m/s and a travel distance of 100 meters.

The invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
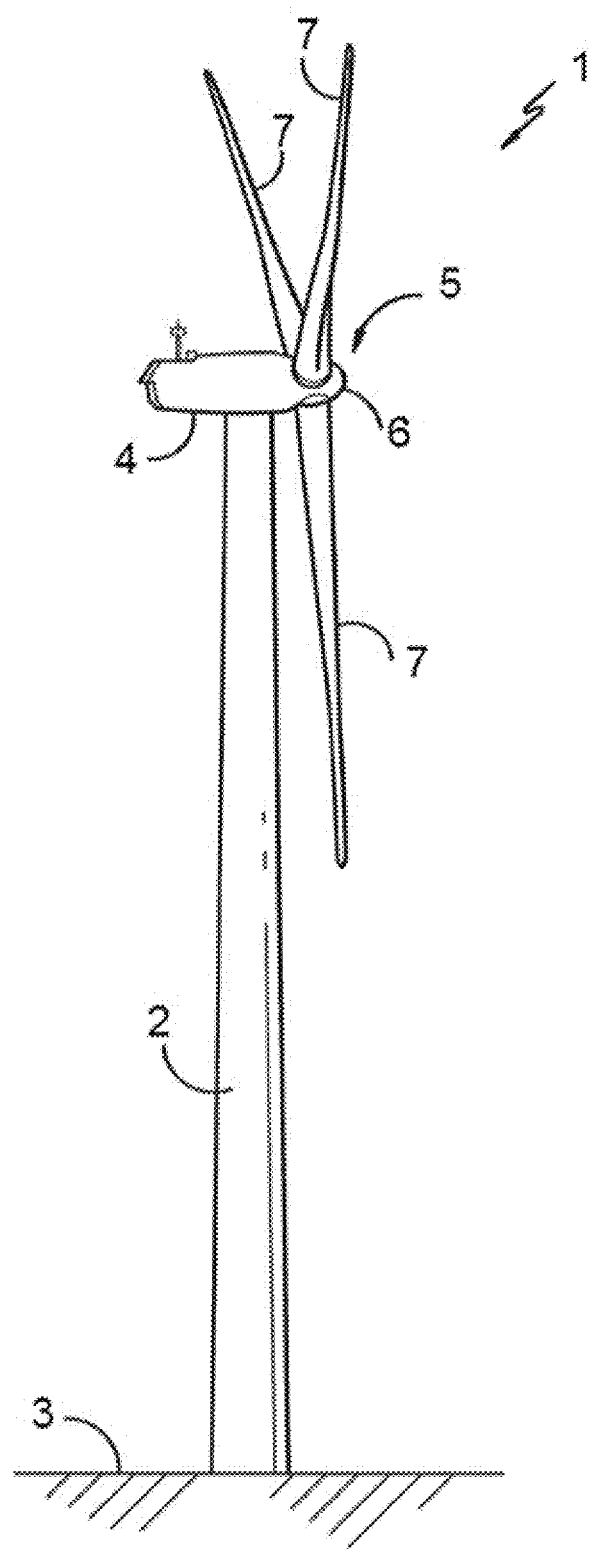
FIG. 1 illustrates a perspective view of a wind turbine according to one example.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. The rotation of the rotor may be directly transmitted, e.g., in direct drive wind turbines, or through the use of a gearbox to a generator.

Figure 2:
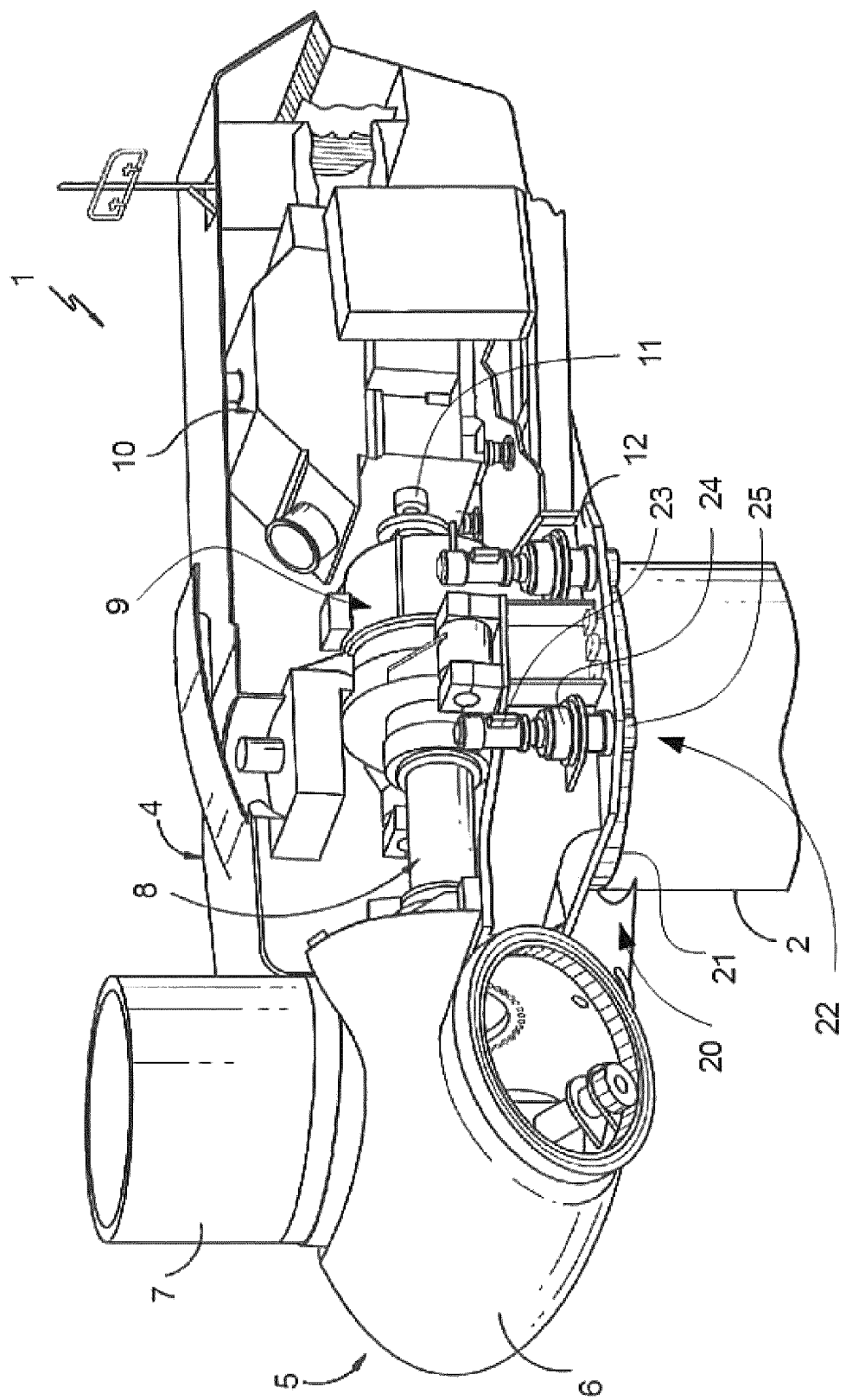
FIG. 2 illustrates a simplified, internal view of a nacelle of a wind turbine according to one example.

FIG. 2 illustrates a simplified, internal view of an example of the geartrain and power generating components within the nacelle 4. The rotor 5 may include a main rotor shaft 8 coupled to the hub 6 for rotation therewith. The generator 10 may then be coupled to the rotor shaft 8 such that rotation of the rotor shaft 8 drives the generator 10. For instance, in the illustrated embodiment, the generator 10 includes a generator shaft 11 rotatably coupled to the rotor shaft 8 through a gearbox 9.

In FIG. 2, the wind turbine rotor 5 may be rotatably mounted on a support frame 12 through two rotor bearings at a coupling region. In other examples, the support frame 12 may not extend through the hub 6 and therefore the rotor may be supported by a single rotor bearing, commonly called the main bearing.

The generator 10 may be electrically coupled to a converter that adapts the output electrical power of the generator to the requirements of the electrical grid. In some examples, the converter may be placed inside the nacelle 4; however, in other examples it may be placed in other locations of the wind turbine.

It should be appreciated that the rotor 5 of the wind turbine and the generator 10 may be supported by a bedplate or a support frame 12 positioned atop the wind turbine tower 2.

The nacelle 4 is rotatably coupled to the tower 2 through a yaw system 20. The yaw system comprises a yaw bearing (not visible in FIG. 2) having two bearing components configured to rotate with respect to the other. The tower 2 is coupled to a first bearing component and the nacelle 4, e.g. the bedplate or support frame 12, is coupled to the second bearing component. The yaw system 20 comprises an annular gear 21 and a plurality of yaw drives 22 with a motor 23, a gearbox 24 and a pinion 25 for meshing with the annular gear for rotating one of the bearing components with respect to the other.

Figure 3:
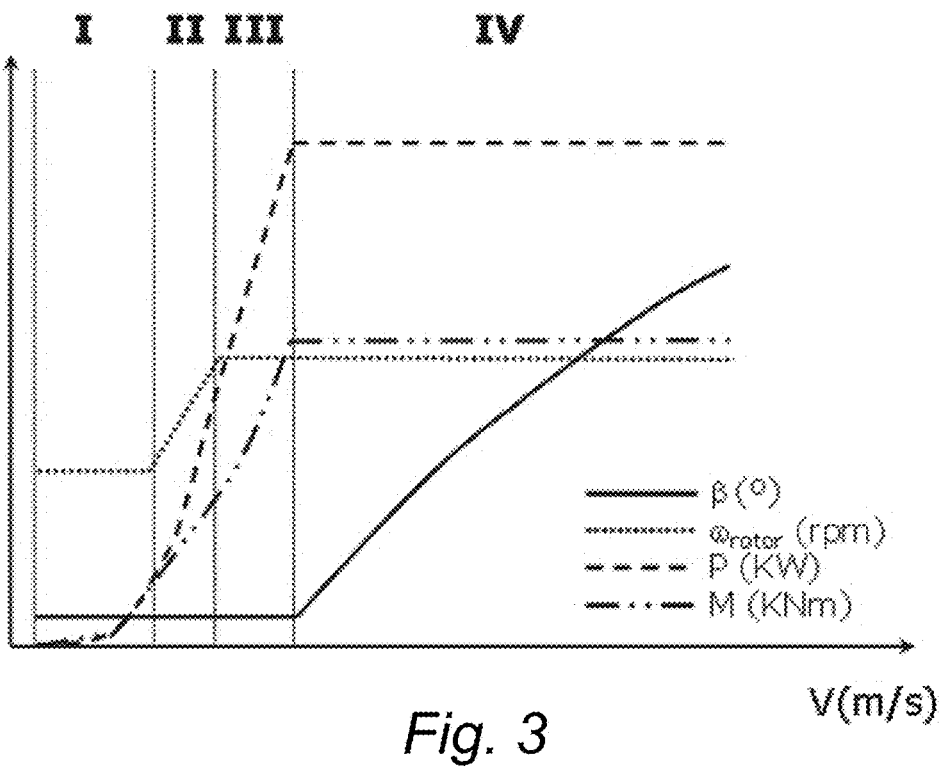
FIG. 3 illustrates a power curve of a wind turbine according to the prior art.

FIG. 3 illustrates a conventional power curve of a wind turbine according to the prior art. The operation of a variable speed wind turbine as a function of wind speed has hereinbefore explained. It may be noted that the operation of the wind turbine is not necessarily based on an actual direct measurement of wind speed. Rather, the wind speed may be derived or estimated from the speed of rotation of the rotor. Typically the generator speed is measured in wind turbines. From the generator speed, the rotor speed can easily be derived.

Figure 4:
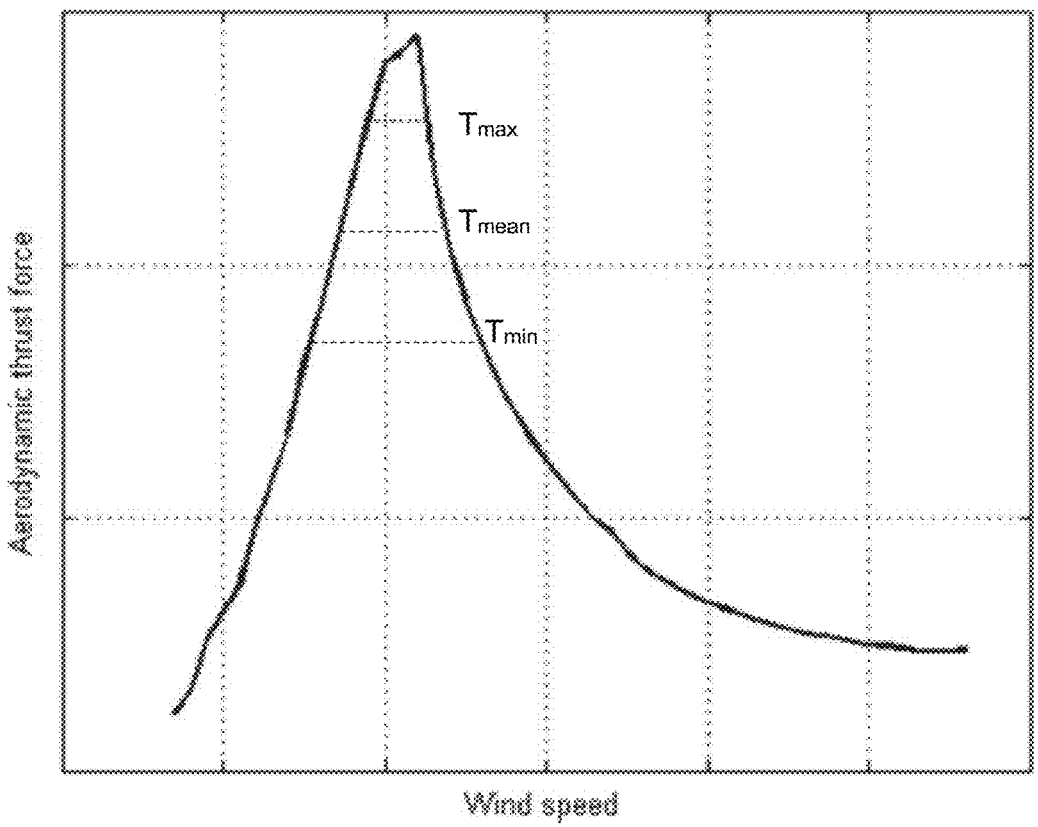
FIG. 4 schematically illustrates an aerodynamic thrust as a function of wind speed when a wind turbine is operated according to a theoretical power curve.

FIG. 4 schematically illustrates an aerodynamic thrust force as a function of wind speed when a wind turbine is operated according to a theoretical power curve. As may be seen in FIG. 4, the aerodynamic thrust on the rotor peaks around the nominal wind speed. In accordance with aspects of the present disclosure a plurality of thrust levels may be introduced to avoid the high peak in aerodynamic thrust and to thereby limit structural loads.

In FIG. 4, a plurality of thrust limits (TL) are depicted, including a minimum, a mean, and a maximum thrust limit. Depending on the level of turbulence at a given moment, one of these thrust limits may be selected. The wind turbine is then operated to ensure that the aerodynamic thrust on the rotor stays below the selected thrust limit.

Figure 5:
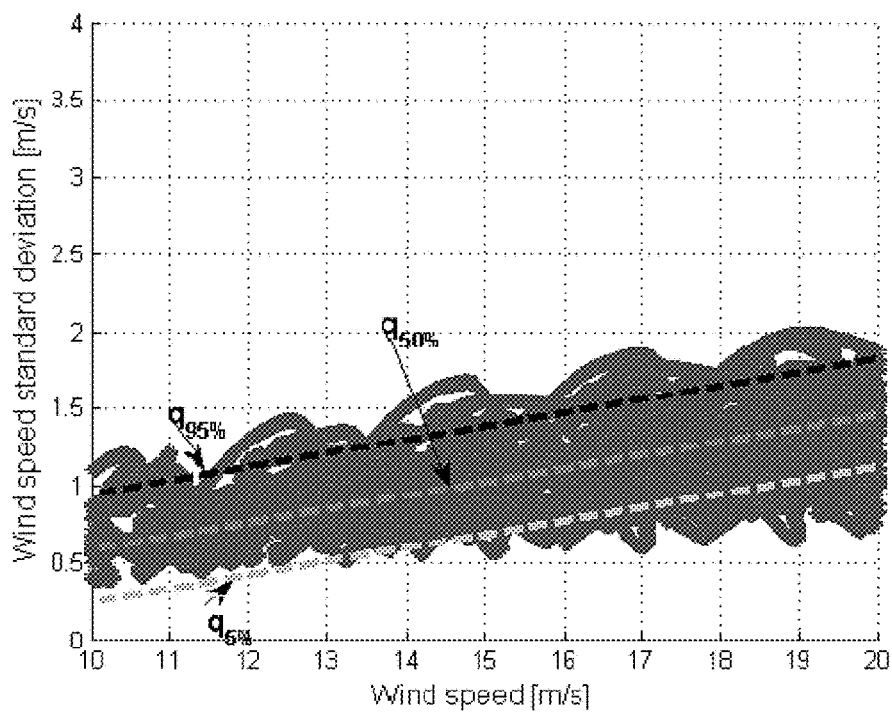
FIG. 5 schematically illustrates an example of determining an isoline of constant turbulence.

FIG. 5 schematically illustrates an example of determining an isoline of constant turbulence probability. In a method for defining a plurality of thrust limits for a wind turbine wherein the thrust limits define values of aerodynamic thrust on the rotor not be exceeded in operation, the example of FIG. 5 may be used. A wind speed distribution representative for the site is provided. In this specific example, a wind range from 10 m/s to 20 m/s has been provided. Typically, thrust limits will act in a range of wind speeds around the nominal wind speed, e.g. from 1-3 m/s below the nominal wind speed to 1-3 m/s above the nominal wind speed.

The wind speed distribution may be obtained from wind speed measurements, e.g. using a met mast, prior to installation of the wind turbine or wind park. The wind speed distribution might also be obtained from wind speed measurements in similar sites or from computer simulation.

In FIG. 5, a plurality of isolines of constant turbulence probability are defined. The isolines represent a turbulence parameter indicative of wind speed variation as a function of wind speed. In this particular example, the turbulence parameter is the standard deviation of the wind speed with respect to a mean wind speed. In further examples, other turbulence parameters might be used, such as e.g. turbulence intensity or variance of wind speed. Turbulence intensity may be defined as standard deviation divided by mean wind speed. The standard deviation is the square root of the variance.

In the particular example depicted in FIG. 5, the turbulence parameter is assumed to be a linear function of the wind speed.

The isolines in FIG. 5 correspond to quantile levels of probability of turbulence of the wind speed distribution. The three lines correspond to 5%, 50%, and 95% quantiles (i.e., a quantile-based regression has been used). The standard deviation in this example is assumed to be a linear function of the wind speed:

$$\sigma_{lim} = a_\sigma V + b_\sigma \in [V_{on}, V_{off}]$$

Herein $\sigma_{lim}$ is the standard deviation as a function of the wind speed V for one of the isolines. The parameters $a_\sigma$ and $b_\sigma$ are the parameters of the linear function. $V_{on}$ and $V_{off}$ are the wind speed at the lower end and the upper end of the wind range for which the linear functions are to be determined.

Different parameters $a_\sigma$ and $b\sigma$ may be defined for each of the isolines.

The wind speed distribution may be regarded as a collection of data points of combinations of wind speed and standard deviation thereof.

In the quantile-based regression, the cost function $J\sigma$ to be minimized for a constant quantile level is given in the following equation:

$$J_\sigma(a_\sigma, b_\sigma) = \int_{V_{on}}^{V_{off}} (a_\sigma V + b_\sigma) dV$$

The 95% isoline represents a confidence level of 95% that turbulence in the wind speed distribution is below the indicated level, i.e. in this example, the standard deviation of wind speed for a given wind speed is below the line.

In this particular example, a range of 10 m/s to 20 m/s was chosen, but it should be clear that different ranges of wind speed might be used. In some examples, a wind speed range may be split in smaller portions e.g. 10-12 m/s, 12-14 m/s, and so on. For each of these smaller rages, quantile-based regression could be performed to find portions of an isoline. In such a case, with the above equations, an isoline may comprise several linear portions.

Once the isolines have been defined, turbulence ranges can be defined with respect to the isolines. The turbulence ranges can be defined above an isoline, below an isoline, or between isolines. One or more of the edges or ends of the turbulence ranges are thereby defined by the isolines.

In this particular example, a turbulence range may be defined below 5%, a second turbulence range extending from 5% to 95%, and a third turbulence range may be defined for turbulence above the 95% isoline. It should be clear that the values of 5%, 50%, and 95% are indicated merely as examples and that other values could be used. It should also be clear that more isolines (and more turbulence ranges) could be defined than in the shown example.

Finally, for each of these ranges, thrust limits may be defined such that (peak) loads are maintained under a predefined acceptable level even in highly turbulent winds. On the other hand, if the wind is less turbulent, higher limits may be used because the peak loads will stay below an acceptable level.

Figure 6:
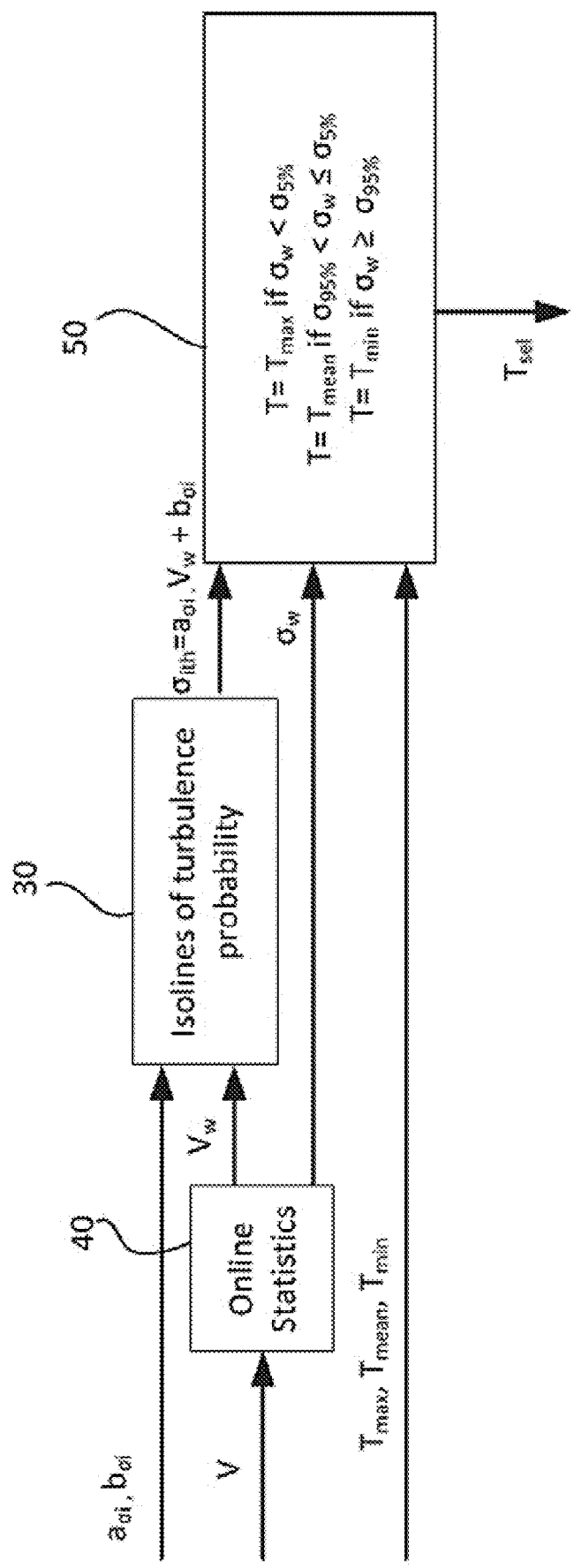
FIG. 6 schematically illustrates an example of a method of operating a wind turbine.

FIG. 6 schematically illustrates an example of a method of operating a wind turbine. Once a plurality of thrust limits have been defined for different turbulence ranges as was just illustrated with reference to FIG. 5, a method for operating a wind turbine might comprise estimating a wind speed and the turbulence parameter and selecting a thrust limit based on the estimated turbulence parameter and the estimated wind speed. Then the wind turbine may be operated such that a thrust on the rotor is below the selected thrust limit.

Input for block 30 includes the parameters $a_{\sigma i}$ and $b_{\sigma i}$ for each of n defined isolines, wherein n is the total number of isolines, and i is the number of an individual isoline. The output of the block 30 is one or more values of standard deviation $\sigma_i$ for the given mean wind speed $V_w$. In this specific case, two standard deviation values are defined for each wind speed, $\sigma_{5\%}$ and $\sigma_{95\%}$.

In operation, the wind speed V might be determined substantially continuously. Substantially continuously herein means that the wind speed is determined with sufficiently high frequency such that it can be taken into account in a meaningful manner in wind turbine operation.

A wind turbine may comprise a remote sensing system to measure wind conditions upstream of the rotor, e.g., a SODAR (sonic detection and ranging) or LIDAR (light detection and ranging). The control system of the wind turbine may be configured to receive the wind conditions from the remote sensing system and to determine the wind speed and turbulence impinging on the rotor based on the measurements of the wind upstream.

Alternatively, the wind turbine may comprise a nacelle anemometer, and the control system is configured to determine wind speed and turbulence based on measurements of the nacelle anemometer (i.e., the nacelle anemometer gives continuous measurements of wind speed V). For an interval (the most recent interval), a mean wind speed $V_w$, and a wind speed variation (in this example standard deviation $\sigma_w$) might be calculated from the data from the nacelle anemometer. However, it is known that the reliability of wind speed measurements using a nacelle anemometer is limited since the wind is disturbed when it reaches the anemometer.

In yet a further example, the wind speed may be estimated by determining a power output, a pitch angle of the blades and a rotational speed of the rotor. Based on the power output, the pitch angle of the blades and the rotational speed of the rotor, wind speed may be estimated using a Kalman filter. Typically, suitable sensors and systems are provided on a wind turbine to measure power output, a pitch angle from the blades (this should be available for suitable pitch control) and the rotational speed of the rotor (typically, the speed of rotation of the generator rotor may be measured). The use of a Kalman filter has been found to be reliable to estimate wind speed.

From a time series of wind speed measurements V, the mean wind speed $V_w$ and the turbulence parameter indicative of variation of the wind speed may be derived at block 40. One of the outputs of block 40 is the chosen turbulence parameter, which in this case is the standard deviation $\sigma_w$ of the wind speed. The output of block 40 is provided as input to blocks 30 and 50.

Within block 50, a plurality of turbulence ranges is defined, for example, below the lowest quantile level, above the highest quantile level, and between the lowest and highest quantile levels. For each of the turbulence ranges, a thrust limit is defined. In this particular example, $T_{max}$ is the highest thrust limit, $T_{min}$ is the lowest thrust limit, and $T_{mean}$ is the average thrust limit. When $T_{min}$ is activated, higher priority is given to maintaining loads under an acceptable level and potential electrical power output is most sacrificed.

If the turbulence level (output from block 40) and wind speed (output from block 40) are known at a given moment, then it is also known in which turbulence range the wind turbine is operating.

If that is known, the suitable thrust limit $T_{sel}$ may be selected from the previously defined thrust limits at block 50. The wind turbine may then be operated to make sure that the aerodynamic thrust on the rotor stays below the selected limit.

To this end, the aerodynamic thrust on the rotor could be measured directly, e.g. using suitable strain or deformation sensors in the blades. Alternatively, the thrust on the rotor can be estimated by calculating the thrust based on the estimated wind speed, the rotational speed of the rotor and the pitch angle of the blades.

In operation, then, an estimated thrust on the rotor can be compared with the selected thrust limit, and if the estimated thrust is above the selected thrust limit, a collective pitch signal may be sent (from the wind turbine control) to the blades of the rotor (or to the pitch control systems) to pitch the blades and reduce the thrust on the rotor.

Figure 12:
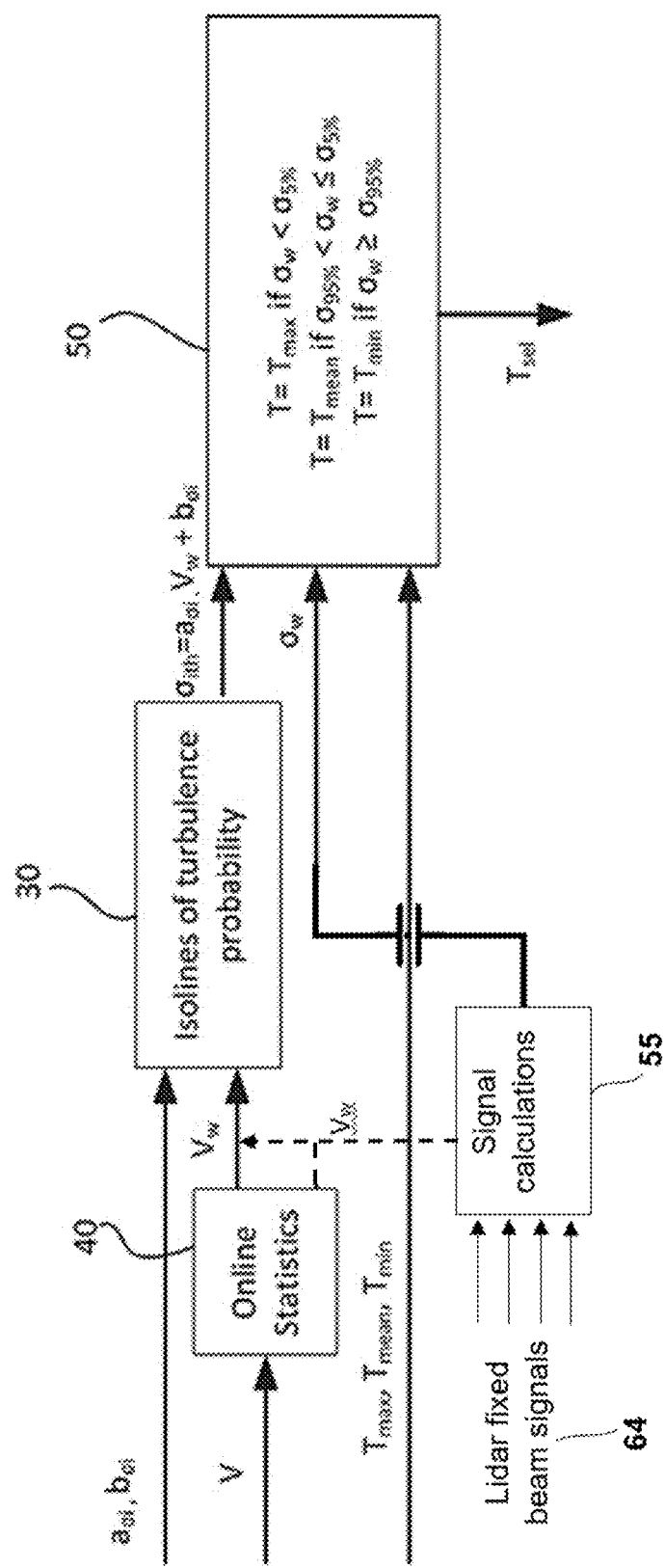
FIG. 12 schematically illustrates another example of a method of operating a wind turbine.

An alternative embodiment of a method and system for detecting and measuring actual turbulence in the incoming wind flow is depicted generally in FIGS. 12-15. This method and system utilizes an active sensing system 60 mounted on the wind turbine 1, for example atop the nacelle 4, to detect wind speed in the wind flow at a plurality of distances/ranges 66 upstream of the rotor 5, as explained in greater detail below. The wind speed measurements are then used to derive a measure of turbulence intensity (wind speed variations) that is provided to the thrust limiting control process (FIG. 12).

The embodiment of FIGS. 12-15 may provide distinct advantages as compared to measuring wind speed from a nacelle-mounted anemometer or from estimating wind speed from a power output, a pitch angle of the blades and a rotational speed of the rotor. For example, with these two methods, to estimate turbulence intensity, the standard deviation of wind speed within a sliding data window is computed, wherein the time length of the data window can be relatively long, for example up to 60 seconds, which may be undesirable in that the turbulence intensity estimate may be slow to respond to actual turbulence changes. Also, relatively large wind excursions in the measured wind speed may unduly influence the wind turbulence estimate for a prolonged time. Hence, the embodiment of FIGS. 12-15 may be desired in certain environments to address these potential drawbacks.

Figure 13:
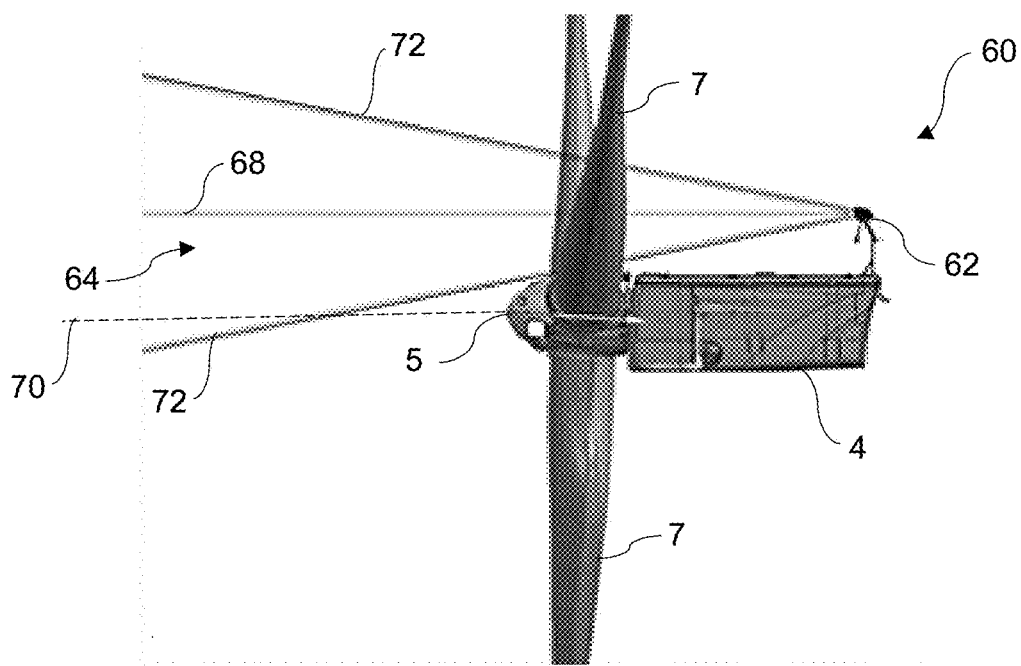
FIG. 13 is a side view of a wind turbine with a active sensing system according to an embodiment mounted atop the nacelle.
Figure 14:
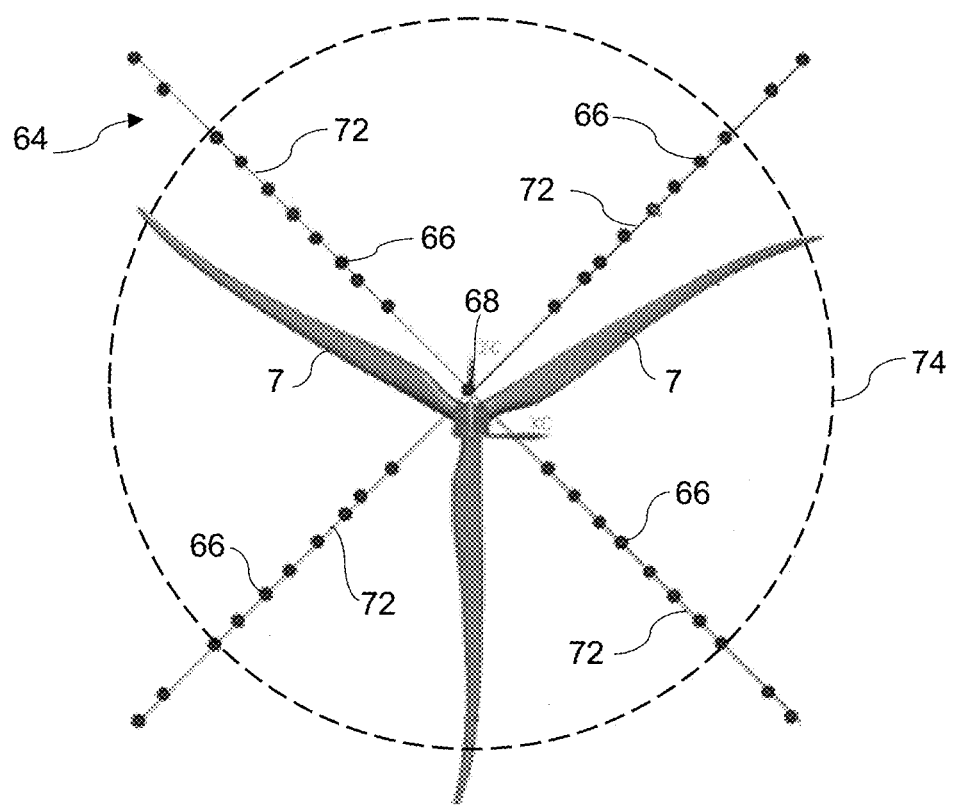
FIG. 14 is a front view of the wind turbine rotor of FIG. 13 depicting multiple fixed measurement beams from the active sensing system.
Figure 15:
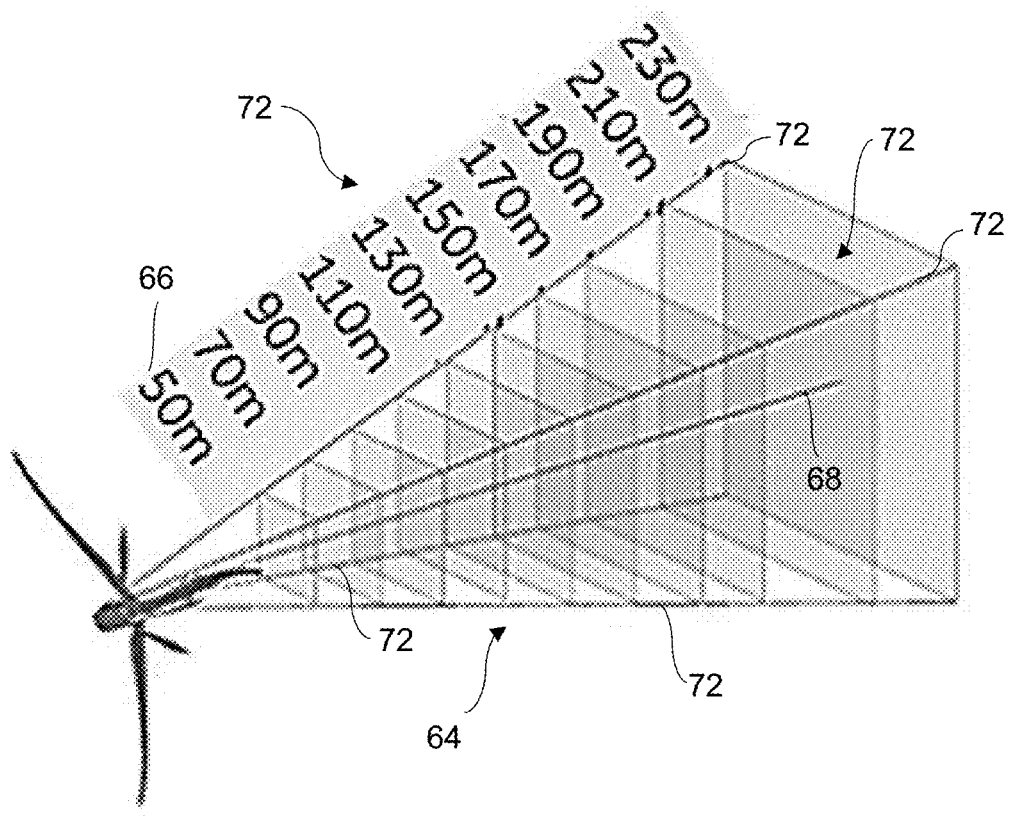
FIG. 15 is a schematic view of the multiple fixed beams arranged around a central axial beam, as well as representative ranges of the fixed distances for detecting wind speed along each of the beams.

Referring to FIGS. 13-15 in general, the active sensing system 60 may be implemented by Doppler lidar system 62 that generates multiple fixed measurement beams 64 directed upwind of the wind turbine rotor 5 to sample the incoming wind flow. In the embodiment illustrated in the figures, the fixed measurement beams 64 may be directed outwardly from the Doppler lidar system 62 at an angle relative to the axis 70 of the rotor 5 so as to define an increasing sample field as distance from the rotor 5 increases, as can be appreciated from FIGS. 13 and 15.

Each of the fixed measurement beams 64 may detect and measure wind speed at a plurality of distances from the system 62. For example, in FIG. 15, each beam 64 detects and measures wind speed at ten separate distances or ranges 66 from the system 62, wherein the range points 66 are twenty meters apart. It should be appreciated that the number of fixed measurement beams 64, number of range points 66 along each beam 64, and distances between the range points 66 can vary for different embodiments, including embodiments that use a configuration of scanning beams rather than fixed beams.

In the depicted embodiment, the Doppler lidar system 60 generates five of the fixed measurement beams 64, wherein one of these beams is a central beam 68 oriented essentially parallel to the rotor axis 70. The other beams 72 are spaced equally around a circular circumference 74. For example, the four fixed beams 72 may be spaced 90 degrees apart on the circular circumference 70.

FIG. 12 depicts the thrust limiting control process of FIG. 6 specifically modified to utilize the information from the Doppler lidar system 60. In the process step 55, the plurality of signals from the fixed measurement beams 64 are input to the controller. The wind speed measurements form the different range points 66 for each beam 64 are used to calculate the mean wind speed $V_w$ of the incoming wind flow and the standard deviation $\sigma_w$ of the wind speed. The standard deviation $\sigma_w$ is input into to the process block 50 (as the turbulence intensity parameter) and used as discussed above with respect to block 50 in FIG. 6. Thus, the estimation of the standard deviation $\sigma_w$ of the mean wind speed at process block 40 in FIG. 6 is eliminated. In addition, the mean wind speed $V_w$ of the incoming wind flow calculated at process block 55 may be used as the input to process block 30 (as indicated by the dashed line in FIG. 12) wherein the estimation of the mean wind speed $V_w$ at process block 40 discussed above with respect to FIG. 6 can also be eliminated. Alternatively, the standard deviation $\sigma_w$ of the wind speed from process block 55 may be input to the process block 40 and used as a check on the estimated value derived at process block 40.

At process block 55, the wind speed measurements and calculation of the mean wind speed $V_w$ and standard deviation G of the wind speed are determined substantially continuously, meaning that the wind speed is determined with sufficiently high frequency such that it can be taken into account in a meaningful manner in wind turbine operation. For example, the measurements and calculations may be performed at a rate of at least 4 Hz. In addition, the standard deviation calculations may be smoothed by a low-pass filter having a filter time constant is adjustable and selected to account for a typical wind speed of the incoming wind flow and the average range of wind speed measurements from the rotor, for example at 10 seconds to reflect a typical wind speed of 10 m/s and a travel distance of 100 meters.

The other aspects of the thrust limiting control process of FIG. 6. discussed above apply also to the process of FIG. 12. For example, the method may include the isolines defining the standard deviation as a linear function of the wind speed within a wind speed range.

Also, the wind speed distribution for the site may be based on wind measurements at a site of the wind turbine.

The method of FIGS. 12-15 may also include selecting one of the thrust limits based on the determined turbulence parameter and the determined wind speed, and operating the wind turbine such that a thrust on the rotor is below the selected thrust limit. For example, the thrust on the rotor may be compared with the selected thrust limit, and if the thrust is above the selected thrust limit, the method includes sending a collective pitch signal to the blades of the rotor to pitch the blades and reduce the thrust on the rotor.

In a further aspect of the present disclosure, and in accordance with the illustrated example, a wind turbine is provided. The wind turbine comprises a rotor with a plurality of blades, one or more pitch systems for rotating the blades around longitudinal axes of the blades, a generator and a control system. The control system is configured to estimate a wind speed and a turbulence, and to select a thrust level based on the turbulence and the estimated wind speed, wherein the thrust level is selected from a plurality of thrust limits for different turbulence ranges, and to send signals to the pitch systems to collectively pitch the blades such that aerodynamic thrust on the rotor is below the selected thrust level. The plurality of thrust levels has been determined by quantile-based regression of a wind speed distribution of wind speed and a parameter indicative of turbulence.

In examples, the control system may use a Kalman filter technique to estimate the wind speed, with the Kalman filter being fed by variables such as the power output, the blade pitch angle and the rotational speed of the rotor.

In other embodiments, the control system is in communication with the active sensing system 60 of FIGS. 12-15 and is configured to substantially continuously measure the wind speed of the incoming wind flow and to calculate a turbulence parameter corresponding to wind speed variations of the measured wind speeds, as discussed above.

In a particular embodiment, the wind turbine may utilize the Doppler lidar system 62 discussed above to generate the multiple fixed measurement beams 64 directed upwind of the wind turbine to sample the incoming wind flow, wherein each of the fixed measurement beams detects wind speed at a different angle relative to the axis 70 of the rotor 5 and at a plurality of different ranges 66 from the rotor 5.

In one embodiment, Doppler lidar system 62 is mounted atop a nacelle 4 of the wind turbine 1. The fixed measurement beams 64 may include a center axial beam 68 and a plurality of other beams 72 projecting at an angle away from the center axial beam to define an increasing sample field as distance from the rotor 5 increases, wherein the beams 72 are spaced equally around a circular circumference 74.

Figure 7:
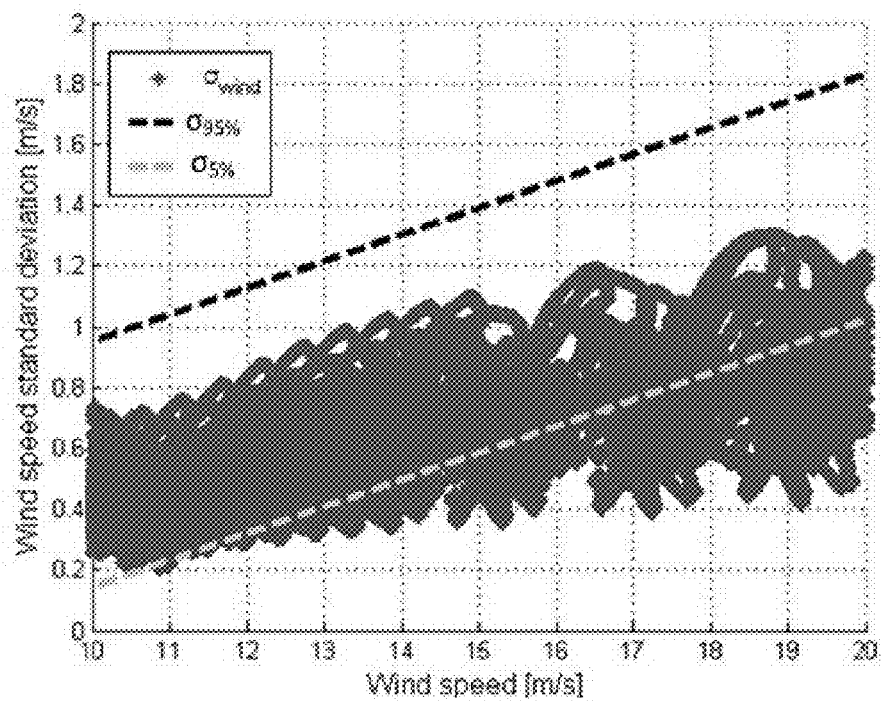
FIGS. 7-9 schematically illustrate the effect of dynamic thrust levels for different wind distributions.
Figure 8:
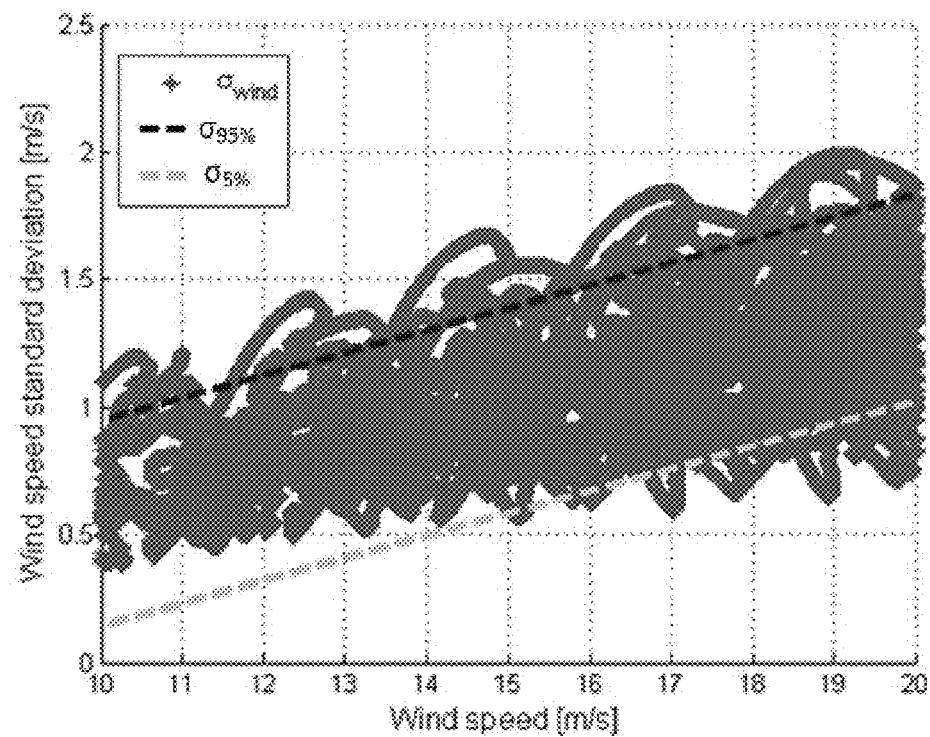
Figure 9:
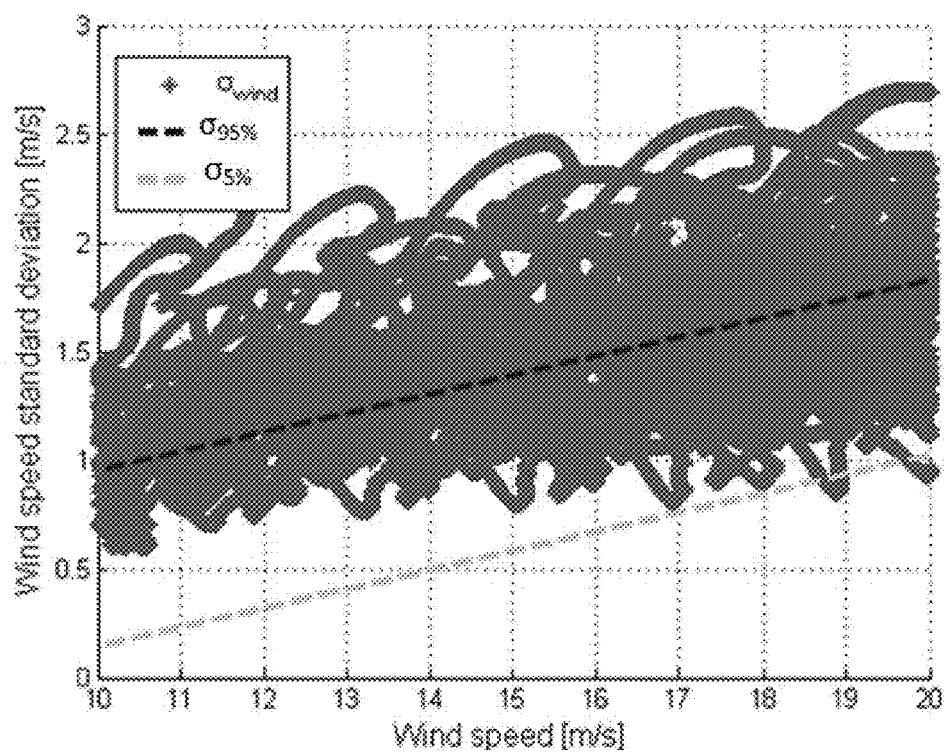

FIGS. 7-9 schematically illustrate the effect of dynamic thrust levels for different wind distributions. FIGS. 7-9 illustrate different wind speed distributions for the same wind turbine at a given site. In accordance with the examples described above, based on a specific wind speed distribution, quantile levels of turbulence probability have been defined. In FIG. 7, at the same site, the wind has relatively low turbulence intensity. In FIG. 8, the wind speed distribution is average, or substantially comparable to the theoretical wind speed distribution. Finally, in FIG. 9, a wind speed distribution that has relatively high turbulence is shown.

In the case of FIG. 7, the thrust limit that will be selected often is a high limit, prioritizing energy production. In the case of FIG. 9 however, the thrust limit that will more often be selected is a rather low limit, sacrificing power output but ensuring that loads stay under a predefined limit.

For all cases, the wind turbine may incorporate some form of control to avoid rapidly changing thrust limits. This could happen, for example, when the turbulence is close to an isoline. To avoid such rapid changes, hysteresis control may be incorporated. One way to implement such a control might be a time delay between entering a thrust range and the selection of a thrust limit. Another way to implement such a control is to have separations between turbulence ranges, and to (linearly) vary the thrust limits between the defined thrust ranges.

In one example of operation, for each of the predefined isolines, one or more check levels are defined, and wherein a thrust limit is not changed until the wind turbulence parameter reaches one of the check levels. The check levels may define small bands around the isolines.

Figure 10:
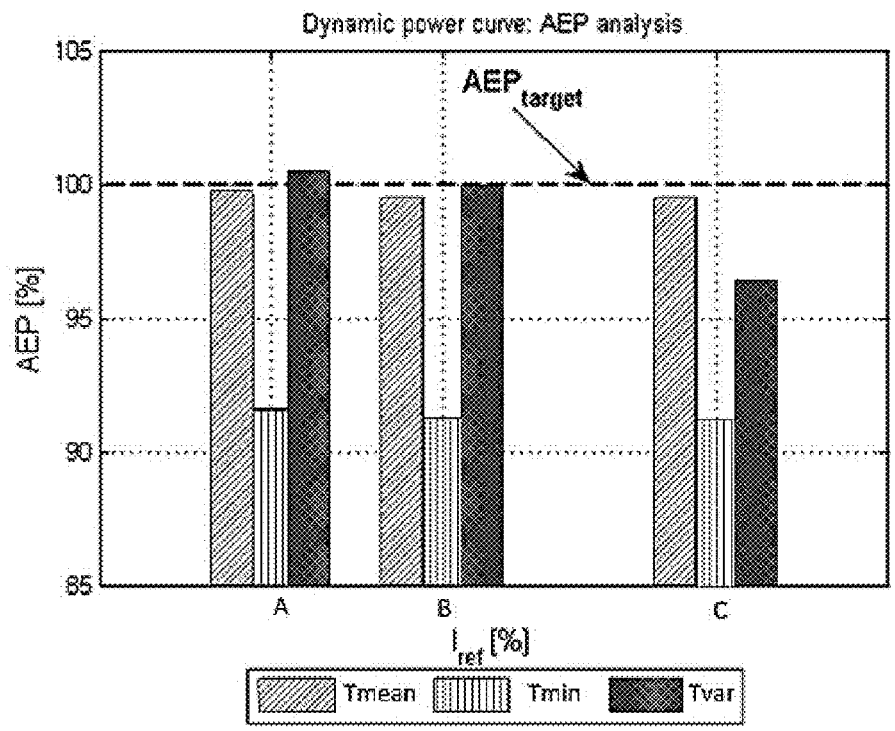
FIGS. 10-11 schematically illustrate the effect of varying thrust levels on the annual energy yield and the blade root bending moments.
Figure 11:
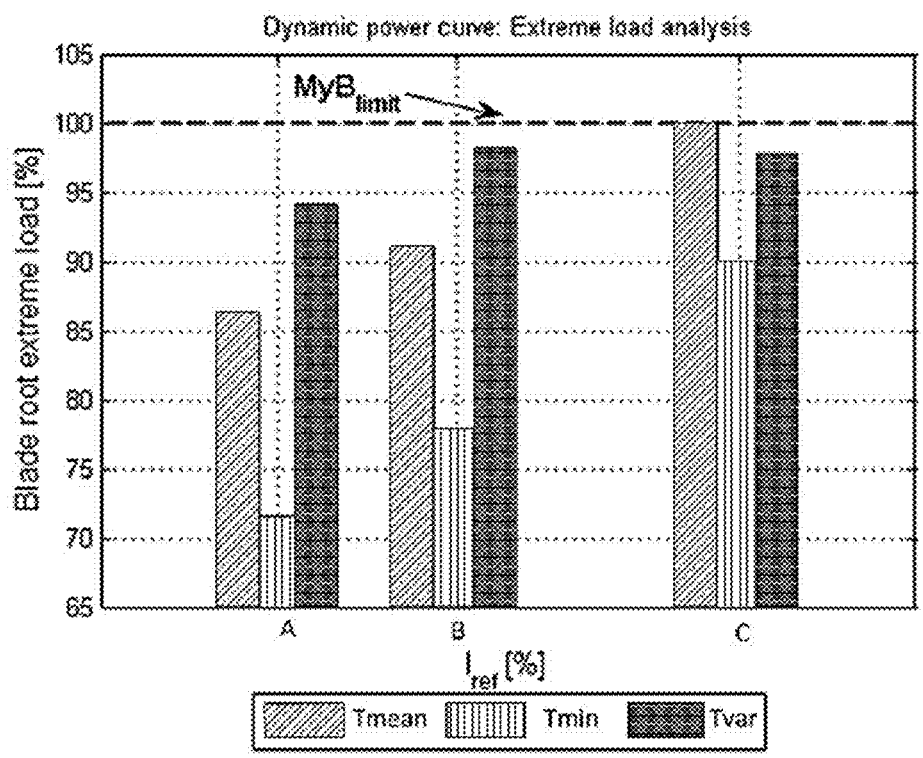

FIGS. 10 and 11 schematically illustrate the effect of varying thrust levels on the annual energy yield and the blade root bending moments. In FIG. 10, the AEP (Annual Energy Production) of a wind turbine with three different setting in three different scenarios is illustrated. The three different settings include a single high thrust limit $T_{mean}$, a single low thrust limit $T_{min}$, and a plurality of thrust limits $T_{var}$. The variable thrust limits include $T_{min}$, $T_{mean}$, and a $T_{max}$ higher than $T_{mean}$ as defined in accordance with examples of the present disclosure. The three scenarios include wind speed simulations with different levels of turbulence intensity, indicated with letters A, B and C. Scenario A corresponds to a scenario with relatively low or little turbulence, scenario B corresponds to "average" turbulence, whereas scenario corresponds to a highly turbulent winds.

In FIG. 11, the bending moment at the blade root for the same three settings ($T_{mean}$, $T_{min}$, $T_{var}$) and same three simulated scenarios (A, B and C) are shown. It may be seen in FIG. 10 that dynamically varying the thrust limits results in an increased annual energy production in the scenarios A and B. It may be seen in FIG. 11 that dynamically varying thrust limits also ensure that loads are controlled. In the most turbulent wind scenario (C), the blade root moment reaches its limit for the control with a single high thrust limit. In scenario C, the single thrust limit yields slightly higher annual energy production but at a significant cost of high loads. These high loads may result in fatigue damage which may lead to a worse performance in the future or to premature replacement or retirement of the wind turbine or its components.

Definition of thrust limits in the herein disclosed manner with quantile-based regression allows for site specific tuning based on the turbulence intensity distribution at the site of interest. Both the confidence levels (quantiles) and the thresholds can be tuned to maximize the power extraction from the wind for sites with relatively low turbulence, whereas for sites where high turbulence, a better trade-off between structural safety (in terms of loads) and power extraction can be achieved by a proper definition of the confidence levels and relative thrust thresholds.

In accordance with the herein disclosed examples, a method for operating a wind turbine including a rotor with a plurality of blades has been disclosed. The method may comprise determining a time series of wind speeds and deriving a mean wind speed and a turbulence parameter indicating variability of the wind speed from the time series. Then, a thrust limit may be selected from a plurality of thrust limits based on the derived turbulence parameter and wind speed. Based on the selected thrust limit, the wind turbine may be operated to ensure that a thrust on the rotor is below the selected thrust limit.

The plurality of thrust limits may be defined for ranges of the turbulence parameter for each possible wind speed (within a wind speed range). The ranges of the turbulence parameter at given mean wind speeds are defined by confidence intervals that the turbulence parameter for the mean wind speed is below a given value in wind data representative for a location of the wind turbine.

In some examples, the wind data representative for a location of the wind turbine includes data for a band of wind speeds including a nominal wind speed of the wind turbine. It is for wind speeds around the nominal wind speed that the aerodynamic thrust on the rotor and the corresponding loads can be high. For wind speeds close to a cut-in wind speed, and wind speeds that are significantly higher than the nominal wind speed, that the aerodynamic thrust is relatively low. In the former case, this is because the energy of the wind is low and in the latter case, this is because the blades of the wind turbine have already been pitched to sufficiently high pitch angles to keep the rotor torque at nominal level. The wind speeds close to a cut-in wind speed and close to cut-out wind speed, or significantly higher than a nominal wind speed, may be safely excluded from such a probability analysis.

Further aspects of the invention are provided by the subject matter of the following clauses:

Clause 1: A method for defining a plurality of thrust limits for a wind turbine located at a site and having a rotor with a plurality of blades, wherein the thrust limits define values of aerodynamic thrust on the rotor not to be exceeded in operation, the method comprising:

providing a wind speed distribution representative for the site, defining one or more isolines of constant turbulence probability representing a turbulence parameter as a function of wind speed, wherein the isolines correspond to quantile levels of turbulence of the wind speed distribution and the turbulence parameter is indicative of wind speed variation;

wherein the turbulence parameter is determined by substantially continuously measuring wind speed upstream of the rotor with an active sensing system and calculating the wind speed variations from the measured wind speed;

defining turbulence ranges with respect to the isolines; and defining thrust limits for the turbulence ranges.

Clause 2: The method according to clause 1, wherein the active sensing system uses a Doppler lidar system to generate multiple measurement beams directed upwind of the wind turbine to sample an incoming wind flow.

Clause 3: The method according to clause 2, wherein the measurement beams are fixed and are directed at a different angle relative to an axis of the rotor to define an increasing sample field as distance from the rotor increases, each of the fixed measurement beams measuring wind speed and at a plurality of different ranges from the rotor.

Clause 4: The method according to clause 3, wherein the Doppler lidar system generates five fixed measurement beams and each fixed measurement beam detects wind speed at ten different ranges from the rotor.

Clause 5: The method according to clause 4, wherein the wind turbine includes a nacelle, the Doppler lidar system is mounted atop the nacelle, the fixed measurement beams comprising a center axial beam and a plurality of additional beams projecting at an angle away from the center axial beam and spaced equally around a circular circumference.

Clause 6: The method according to clause 3, wherein wind measurements from the plurality of different ranges for each fixed measurement beam are used to calculate a mean wind speed of the incoming wind flow and a standard deviation of the wind speed, wherein the standard deviation of the wind speed corresponds to the turbulence parameter.

Clause 7: The method according to clause 6, wherein the wind speed measurements and calculation of the standard deviation are performed at a rate of at least 4 Hz, the standard deviation calculations smoothed by a low-pass filter.

Clause 8: The method according to clause 7, wherein a filter time constant for the low-pass filter is adjustable and selected to approximate a typical wind speed of the incoming wind flow and an average range of wind speed measurements from the rotor.

Clause 9: The method according to clause 6, wherein the isolines define the standard deviation as a linear function of the wind speed within a wind speed range.

Clause 10: The method according to clause 1, wherein the wind speed distribution for the site is based on wind measurements at a site of the wind turbine.

Clause 11: The method according to clause 1, further comprising selecting one of the thrust limits based on the determined turbulence parameter and the determined wind speed, and operating the wind turbine such that a thrust on the rotor is below the selected thrust limit.

Clause 12: The method according to clause 11, wherein operating the wind turbine such that a thrust on the rotor is below the predetermined thrust limit comprises comparing the thrust on the rotor with the selected thrust limit, and if the thrust is above the selected thrust limit, sending a collective pitch signal to the blades of the rotor to pitch the blades and reduce the thrust on the rotor.

Clause 13: A wind turbine comprising:

a rotor with a plurality of blades;

a pitch system configured with the blades to rotate the blades around longitudinal axes of the blades;

an active sensing system mounted on the wind turbine, the active sensing system comprising a Doppler lidar system that generates multiple measurement beams upwind of the wind turbine to detect wind speed of an incoming wind flow;

a control system in communication with the Doppler lidar system and configured to:

substantially continuously measure the wind speed of the incoming wind flow and calculate a turbulence parameter corresponding to wind speed variations from the measured wind speeds;

select a thrust level based on the turbulence parameter and the measured wind speed, wherein the thrust level is selected from a plurality of thrust limits for different turbulence ranges, the plurality of thrust limits determined by quantile-based regression of a wind speed distribution of wind speed and the turbulence parameter; and send signals to the pitch system to collectively pitch the blades such that aerodynamic thrust on the rotor is below the selected thrust level.

Clause 14: The wind turbine according to clause 13, wherein the Doppler lidar system is configured to generate multiple fixed measurement beams upwind of the wind turbine to sample the incoming wind flow, wherein each of the fixed measurement beams measures wind speed at a different angle relative to an axis of the rotor and at a plurality of different ranges from the rotor.

Clause 15: The wind turbine according to clause 14, further comprising a nacelle, the Doppler lidar system mounted atop the nacelle, the fixed measurement beams comprising a center axial beam and a plurality of beams projecting at an angle away from the center axial beam and spaced equally around a circular circumference.

Clause 16: The wind turbine according to clause 15, wherein the control system is configured to use the wind measurements from the plurality of different ranges for each fixed measurement beam to calculate a mean wind speed of the incoming wind flow and a standard deviation of the wind speed, wherein the standard deviation of the wind speed corresponds to the turbulence parameter.

Clause 17: The wind turbine according to clause 16, wherein the wind speed measurements and calculation of the standard deviation are performed by the control system at a rate of at least 4 Hz, the standard deviation calculations smoothed by a low-pass filter.

Clause 18: The wind turbine according to clause 17, wherein the control system sets the filter time constant for the low-pass filter to approximate a typical wind speed of the incoming wind flow and an average range of wind speed measurements from the rotor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for defining a plurality of thrust limits for a wind turbine located at a site and having a rotor with a plurality of blades, wherein the thrust limits define values of aerodynamic thrust on the rotor not to be exceeded in operation, the method comprising:
providing a wind speed distribution representative for the site,
defining one or more isolines of constant turbulence probability representing a turbulence parameter as a function of wind speed, wherein the isolines correspond to quantile levels of turbulence of the wind speed distribution and the turbulence parameter is indicative of wind speed variation;
wherein the turbulence parameter is determined by substantially continuously measuring wind speed upstream of the rotor with an active sensing system and calculating the wind speed variations from the measured wind speed;
defining turbulence ranges with respect to the isolines; and
defining thrust limits for the turbulence ranges.

2. The method according to claim 1, wherein the active sensing system uses a Doppler lidar system to generate multiple measurement beams directed upwind of the wind turbine to sample an incoming wind flow.

3. The method according to claim 2, wherein the measurement beams are fixed measurement beams directed at a different angle relative to an axis of the rotor to define an increasing sample field as distance from the rotor increases, each of the fixed measurement beams measuring wind speed and at a plurality of different ranges from the rotor.

4. The method according to claim 3, wherein the Doppler lidar system generates five fixed measurement beams and each fixed measurement beam detects wind speed at ten different ranges from the rotor.

5. The method according to claim 4, wherein the wind turbine includes a nacelle, the Doppler lidar system mounted atop the nacelle, the fixed measurement beams comprising a center axial beam and a plurality of additional beams projecting at an angle away from the center axial beam and spaced equally around a circular circumference.

6. The method according to claim 3, wherein wind measurements from the plurality of different ranges for each fixed measurement beam are used to calculate a mean wind speed of the incoming wind flow and a standard deviation of the wind speed, wherein the standard deviation of the wind speed corresponds to the turbulence parameter.

7. The method according to claim 6, wherein the wind speed measurements and calculation of the standard deviation are performed at a rate of at least 4 Hz, the standard deviation calculations smoothed by a low-pass filter.

8. The method according to claim 7, wherein a filter time constant for the low-pass filter is adjustable and selected to approximate a typical wind speed of the incoming wind flow and an average range of wind speed measurements from the rotor.

9. The method according to claim 6, wherein the isolines define the standard deviation as a linear function of the wind speed within a wind speed range.

10. The method according to claim 1, wherein the wind speed distribution for the site is based on wind measurements at a site of the wind turbine.

11. The method according to claim 1, further comprising selecting one of the thrust limits based on the determined turbulence parameter and the determined wind speed, and operating the wind turbine such that a thrust on the rotor is below the selected thrust limit.

12. The method according to claim 11, wherein operating the wind turbine such that a thrust on the rotor is below the predetermined thrust limit comprises comparing the thrust on the rotor with the selected thrust limit, and if the thrust is above the selected thrust limit, sending a collective pitch signal to the blades of the rotor to pitch the blades and reduce the thrust on the rotor.

13. A wind turbine comprising:
a rotor with a plurality of blades;
a pitch system configured with the blades to rotate the blades around longitudinal axes of the blades;
an active sensing system mounted on the wind turbine, the active sensing system comprising a Doppler lidar system that generates measurement beams upwind of the wind turbine to detect wind speed of an incoming wind flow;
a control system in communication with the Doppler lidar system and configured to:
substantially continuously measure the wind speed of the incoming wind flow and calculate a turbulence parameter corresponding to wind speed variations from the measured wind speeds;
select a thrust level based on the turbulence parameter and the measured wind speed, wherein the thrust level is selected from a plurality of thrust limits for different turbulence ranges, the plurality of thrust limits determined by quantile-based regression of a wind speed distribution of wind speed and the turbulence parameter; and
send signals to the pitch system to collectively pitch the blades such that aerodynamic thrust on the rotor is below the selected thrust level.

14. The wind turbine according to claim 13, wherein the Doppler lidar system is configured to generate multiple fixed measurement beams upwind of the wind turbine to sample the incoming wind flow, wherein each of the fixed measurement beams detects wind speed at a different angle relative to an axis of the rotor and at a plurality of different ranges from the rotor.

15. The wind turbine according to claim 14, further comprising a nacelle, the Doppler lidar system mounted atop the nacelle, the fixed measurement beams comprising a center axial beam and a plurality of beams projecting at an angle away from the center axial beam and spaced equally around a circular circumference.

16. The wind turbine according to claim 15, wherein the control system is configured to use the wind measurements from the plurality of different ranges for each fixed measurement beam to calculate a mean wind speed of the incoming wind flow and a standard deviation of the wind speed, wherein the standard deviation of the wind speed corresponds to the turbulence parameter.

17. The wind turbine according to claim 16, wherein the wind speed measurements and calculation of the standard deviation are performed by the control system at a rate of at least 4 Hz, the standard deviation calculations smoothed by a low-pass filter.

18. The wind turbine according to claim 17, wherein the control system sets the filter time constant for the low-pass filter to approximate a typical wind speed of the incoming wind flow and an average range of wind speed measurements from the rotor.

\* \* \* \* \*